June 8, 1954 T. L. McMAHON Re. 23,835

PREFABRICATED HANK OF RIBBON FOR MAKING ORNAMENTAL POMPON BOWS

Original Filed Oct. 28, 1950 2 Sheets-Sheet 1

Inventor
Thomas L. McMahon
By Carpenter, Abbott, Coulter & Kinney
Attorneys

Inventor
Thomas L. McMahon
By Carpenter, Abbott, Coulter & Kinney
Attorneys

Reissued June 8, 1954

Re. 23,835

UNITED STATES PATENT OFFICE 23,835

PREFABRICATED HANK OF RIBBON FOR MAKING ORNAMENTAL POMPON BOWS

Thomas L. McMahon, Amarillo, Tex., assignor to Minnesota Mining & Manufacturing Company, St. Paul, Minn., a corporation of Delaware Original No. 2,587,502, dated February 26, 1952, Serial No. 192,695, October 28, 1950, Application for reissue March 11, 1952, Serial No. 275,938

9 Claims. (Cl. 41—10)

Matter enclosed in heavy brackets [ ] appears in the original patent but forms no part of this reissue specification; matter printed in italics indicates the additions made by reissue.

This invention relates to the art of "gift-wrapping" packages and provides a novel prefabricated "hank" of decorative ribbon whereby the ornamental pompon bows customarily used on gift packages may be easily and quickly fabricated even by a housewife who has had little or no experience in making such bows. It further provides a partially completed bow which may be kept, ready to use, by the gift wrapping departments of retail stores and the like, and very quickly converted into a finished bow, and attached to a "gift-wrapped" package.

In recent years the "gift-wrapping" of packages has become a highly commercialized business. Various manufacturers have placed many new and attractive wrapping papers, decorative ribbons and the like on the market, and the various women's magazines very frequently feature articles promoting these materials and new techniques for their use. One of the basic techniques which has been promoted, and which is now used on almost all fancily wrapped packages, is the ornamental pompon bow, fashioned from many loops of decorative ribbon to resemble a tufted ball. Such pompon bows are often illustrated in magazine articles of the type above referred to, and the reader is given directions for making them. However, it has heretofore been very difficult for a person, who only infrequently has occasion to do gift wrapping, and thus has no particular skill in such procedure, to make up a bow which is sufficiently attractive to add to the appearance of the package.

Furthermore it takes considerable time, even by skilled wrappers employed in department stores, to make a presentable pompon bow, and, during the seasonal rush periods, such as Christmas time, it is very difficult for them to turn out all the packages brought in for fancy wrapping.

It is, therefore, an object of this invention to provide a partially manufactured bow which is suitable for storing away until required for use and which then may be very simply converted into a completely finished, attractive and symmetrical pompon bow.

Referring now to the drawings, which illustrate both the "prefabricated hank" and a method of making such a hank;

Figure 1:
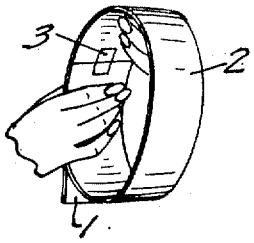
Figure 1 is a perspective view of the initial step of forming a coil of decorative ribbon.
Figure 2:
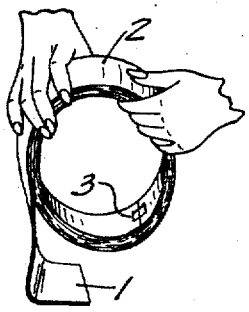
Figure 2 is a perspective view of the completed coil of ribbon.

Referring now in more detail to the drawing, reference character 1 indicates a strip of decorative ribbon, of the kind, for instance, manufactured by Minnesota Mining & Manufacturing Co., Saint Paul 6, Minnesota, and sold by it under its trade-marks "Sasheen," "Decorette" and "Lacelon." Said ribbon may be of any width suitable to the size of the package. It may, however, be noted that the width of ribbon customarily used for pompon bows is from ½" for small packages up to about 3 inches for large packages. As indicated in Figure 1, ribbon 1 is wound into coil 2, the inner end of the ribbon being held in place on the next succeeding layer of ribbon by strip of cellophane tape or masking tape 3. I have found that, to provide an attractive bow, there should be at least three circumvolutions of ribbon 1 in coil 2, and in most instances, seven or eight circumvolutions will be desired. As will be apparent from the drawing, each circumvolution of ribbon will provide two end loops on the finished bow. Thus, when prefabricating the hank, the number of circumvolutions in the coil may be governed by the degree of fullness desired in the finished bow.

Figure 3:
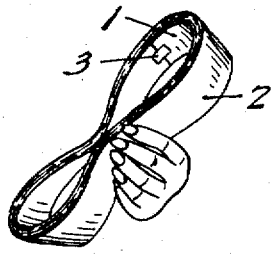
Figure 3 is a perspective view of the completed coil pressed into a hank.
Figure 4:
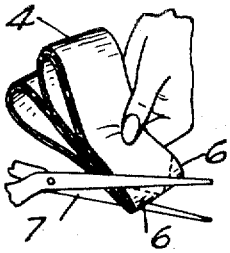
Figure 4 is a perspective view of the hank folded lengthwise upon itself and in the process of being notched.

Coil 2, after being wound, is elongated and flattened into hank 4 by bringing together opposed portions of the circumference of the coil, as shown in Figure 3. The hank, thus flattened, is then preferably folded upon itself, intermediate its ends, and the corner portions thereof, 6, adjacent the fold, are clipped off, as for instance, by scissors 7, to provide V-shaped notches 8. The portion of hank 4 lying between the apexes of notches 8, is then tied with string or ribbon 9.

Notches 8 should each desirably extend inwardly across hank 4 at least one quarter of the width of the hank so that when the hank is tied with ribbon 9, there will not be an excessive "bunching" of the ribbon between the notches. On the other hand, said notches should not be so deep as to weaken the hank seriously. In most cases it will be desired to place notches 8 equidistantly between the ends of the hank. However, in some instances it may be preferred to place them more nearly toward one end of the hank, in which case the loops on one end of the finished bow will be longer and will give the bow an unbalanced look possibly desirable in some unusual packaging scheme.

Figure 9:
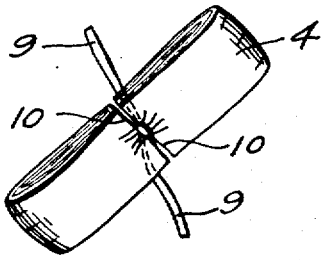
Figure 9 is a perspective view of another embodiment of this invention wherein the hank of Figure 3 is provided with slits, rather than notches, extending inwardly from the edges of said hank.

It is preferred that notches 8 be V-shaped, both because such notches are easier to excise from the hank, and because a finished bow, made from a hank bearing such shaped notches, better retains its initial symmetrical appearance. However, notches of other shapes, such as semicircular or with square or substantially square corners, may be provided. Also, instead of notches, the hank may merely be slit inwardly from the edges thereof. A prefabricated hank provided with slits, rather than notches, is shown in Figure 9 of the drawings. In this embodiment of the invention, slits 10 perform the same functions as do notches 8 in the preferred structure; that is, they function to "interlock" the end loops of the hank in upstanding position to form the loops of the finished bow, as hereinafter described.

Figure 5:
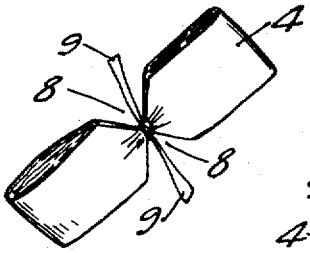
Figure 5 is a view of the notched hank, unfolded, and tied about the portion thereof lying between the notches.

The end portions of ribbon 9 may be left long, as shown in Figure 5, to provide means for attaching the finished bow to the package, or they may be cut off and the bow attached by other means.

The prefabricated hank, shown in Figures 5 and 9, is suitable for manufacture in quantity and for sale in those forms to department stores and the like either for use in their own gift wrapping departments or for re-sale to housewives and the like who may wish to purchase the hank and themselves convert it into a bow. As above indicated, the hank can be stored away until it is ready for use, at which time it can very easily be converted (in the manner hereinafter described) into a bow far more attractive and symmetrical than any which could hitherto be made by anyone other than a skilled gift wrapper, and, even in the case of such skilled persons, an attractive bow can be created by them in much less time than was needed for previously known methods.

Figure 6:
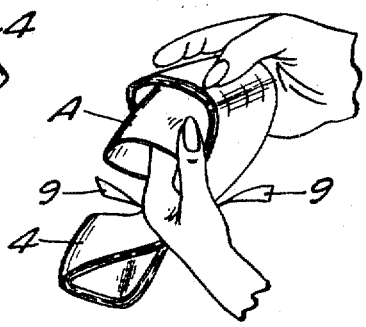
Figure 6 is a view of the hank, prefabricated as in Figure 5, being converted into a pompon bow.
Figure 7:
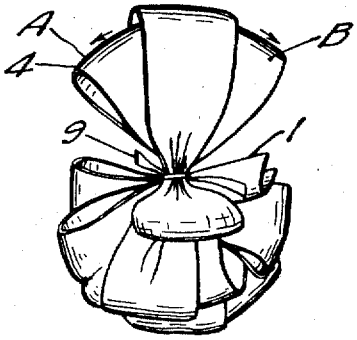
Figure 7 is a view of the hank with one end portion thereof converted into the loops of a pompon bow.
Figure 8:
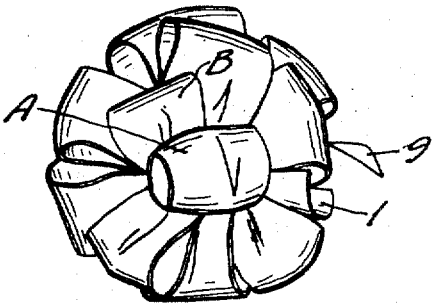
Figure 8 is a view of the hank completely converted into a pompon bow.

Figures 6 and 7 indicate the manner in which the prefabricated hank is converted into the pompon bow shown in Figure 8. After the hank has been tied, as shown in Figure 5, the innermost loop A on one end of the hank is disassociated from the loops overlying it by pulling said loop out sideways from the hank so that it will extend substantially perpendicularly to the hank. The loop A is then twisted and raised to upstanding position whereupon the narrow midportion of loop A "interlocks" with the notches on the remainder of the hank, and the loop A is thus retained in upstanding position to form one of the loops of the bow. The notch upon the outwardly facing edge of the loop A provides sufficient "give" to the loop so that it will not drop downwardly once it is arranged in upstanding position.

Loop B, which immediately overlies loop A in the hank, is then pulled out from the side of the hank other than the one from which loop A was removed, and it, in turn, is twisted and raised to upstanding position. This process is repeated, first to one side of the hank and then to the other, until all the loops on one end have been arranged. The same procedure is then followed in respect to the other end of the hank. Normally, the innermost loops of the hank, which are first pulled out and arranged, will form the central loops on the bow rather than those about the edges thereof.

Figure 10:
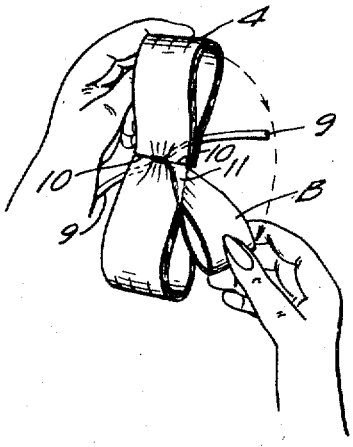
Figure 10 is a perspective view of the hank of Figure 9 with one end loop thereof pulled out and back to lie within a slit.

Figure 10 illustrates the initial step in converting the "slit" hank of Figure 9 into a decorative bow. The prefabricated hank is held in the manner shown and the innermost loop, B, is thereupon pulled out sideways and raised to lie within slit 10 in the same manner as hereinabove described in connection with the "notched" hank of Figure 5. In the case of the "slit" hank, corner portion 11, which, in the "notched" hank, has been excised to form the notch, is caused to be folded over end loop B in the manner shown, when that end loop is disassociated from the hank.

The procedure above outlined can be easily mastered after only a very slight amount of practice, and the hank converted into a bow in a matter of seconds. It will readily be appreciated that the time-saving feature of this invention, in particular, is of great value and importance to busy gift wrap departments who, at certain times of the year, may be called upon to wrap hundreds and even thousands of packages where an ornamental pompon bow is required. The simplicity of the technique is also important to them (as well as to housewives) by reason of the fact that their help, hired extra for seasonal rushes, may not be particularly proficient, or proficient at all, at tying pompon bows by conventional methods.

It will of course be apparent that there are certain obvious modifications which could be made in the hank here described, and also in the steps and sequence thereof by which said hank is converted into a bow. However, it should be understood that such obvious modifications are within the spirit and scope of this invention, and that the particular forms illustrated place no limitation thereon except as defined in the appended claims.

What I claim is:

1. A hank of decorative ribbon prefabricated for easy conversion into an ornamental pompon bow, said hank comprising at least three circumvolutions of ribbon, a point on the perimeter of said hank being provided with opposed V-shaped notches extending apex inwardly from each edge of the hank, a second point on the perimeter of the hank being similarly provided with opposed V-shaped notches, said second point being about half way around the perimeter from the first point, and means for holding said notched portions of the hank in juxtaposition, the circumvolutions of ribbon lying toward the ends of the hank being adapted to be disassociated from each other for arrangement into an ornamental pompon bow.

2. An elongated hank of decorative ribbon prefabricated for easy conversion into an ornamental pompon bow, said hank comprising at least three circumvolutions of ribbon, each edge portion of the hank being provided with a notch extending apex inwardly at least one-fourth of the width of said hank, the apexes of said notches being opposed, the circumvolutions of ribbon lying between said apexes being joined together, the circumvolutions of ribbon comprising the end portions of the hank being adapted to be disassociated from each other for arrangement to comprise the loops of an ornamental pompon bow.

3. An elongated hank of decorative ribbon prefabricated for easy conversion into an ornamental pompon bow, said hank comprising at least three circumvolutions of ribbon, each edge portion of the hank, equidistantly intermediate the ends thereof, being provided with a V-shaped notch extending apex inwardly from its edge, a member retaining together the circumvolutions of ribbon lying between said notches, the circumvolutions of ribbon comprising the end portions of the hank being adapted to be disassociated from each other for arrangement to comprise the loops of an ornamental pompon bow.

4. A new article of manufacture prefabricated for easy conversion into an ornamental pompon bow, comprising an elongated hank and a hank tying member, said hank comprising at least three circumvolutions of decorative ribbon, each edge portion of the hank, equidistantly intermediate the ends thereof, being provided with a V-shaped notch extending apex inwardly at least one-fourth of the width of the hank, the ribbon between said notches being circled and held together by said hank-tying member to provide termini for the looped end portions of the hank, said hank being converted into a pompon bow by disassociation of the loops on each end portion from one another and arrangement of the same symmetrically.

5. A hank of decorative ribbon prefabricated for easy conversion into an ornamental pompon bow, said hank comprising at least three circumvolutions of ribbon, a point on the perimeter of said hank being provided with opposed notches extending inwardly from each edge of the hank, a second point on the perimeter of the hank being similarly provided with opposed notches, the notched portions of said hank being adapted to be held in juxtaposition to provide termini for the looped end portions of the hank, said hank being convertible into a pompon bow by disassociation of the loops on each end portion from one another and arrangement of the same symmetrically.

6. An elongated hank of decorative ribbon prefabricated for easy conversion into an ornamental pompon bow, said hank comprising at least three circumvolutions of ribbon, each edge portion of the hank, intermediate the ends thereof, being provided with a slit extending inwardly at least one-fourth of the width of the hank, said slits being opposed, and means for joining together the circumvolutions of ribbon lying between the inwardly extending tips of said slits, the circumvolutions of ribbon comprising the end portions of the hank being adapted to be disassociated from each other for arrangement to comprise the loops of an ornamental pompon bow.

7. The method of fabricating decorative ribbon to form a hank readily convertible into an ornamental pompon bow comprising forming a coil of decorative ribbon, excising a first pair of notches from the edge portions of the coil, said notches extending apex inwardly at least one-fourth of the width of the coil, the apexes of the notches being opposed, forming of a like pair of notches on the edge portions of the coil diametrically opposite to said first pair of notches, the apexes of said second pair of notches likewise being opposed, bringing said notched portions of the coil together, and securing together the portions of the coil lying between each pair of notches, thereby forming a terminus for the looped end portions of the coil, which may readily be separated from each other to form a pompon bow.

8. The method of making an ornamental pompon bow from a strip of decorative ribbon comprising forming a flat coil of said decorative ribbon, bringing together diametrically opposed portions of said coil, excising a pair of opposed V-shaped notches through the thickness of the coil thus brought together, said notches extending apex inwardly, securing together the layers of ribbon lying between the apexes of said notches, and then spreading and twisting the loops comprising both end portions of the coil from one another in a symmetrical arrangement.

*9. A hank of decorative ribbon prefabricated for easy conversion into an ornamental pompon bow, said hank comprising at least three circumvolutions of ribbon, a point on the perimeter of said hank being cut inwardly from an edge, a second point on the perimeter being similarly cut, the cut portions of said hank being adapted to be held in juxtaposition to provide termini for the looped end portions of the hank, said hank being convertible into a pompon bow by disassociation of the loops on each end portion from one another and arrangement of the same symmetrically.*

References Cited in the file of this patent or the original patent

UNITED STATES PATENTS

| Number | Name | Date |
|---|---|---|
| 1,800,729 | Hodges | Apr. 14, 1931 |
| 1,895,758 | Goldsmith | Jan. 31, 1933 |
| 2,104,248 | Stark | Jan. 4, 1938 |
| 2,105,436 | Flatto | Jan. 11, 1938 |
| 2,447,843 | Cookman | Aug. 24, 1948 |